United States Patent
Goodwin, III et al.

(10) Patent No.: US 7,437,324 B1
(45) Date of Patent: Oct. 14, 2008

(54) SYSTEM AND METHOD OF TRACKING BILL PAYMENT METHODS

(75) Inventors: John C. Goodwin, III, Suwanee, GA (US); Robert Randall Schlieker, Arlington, TX (US)

(73) Assignee: NCR Corporation, Dayton, OH (US)

( * ) Notice: Subject to any disclaimer, the term of this patent is extended or adjusted under 35 U.S.C. 154(b) by 1341 days.

(21) Appl. No.: 09/950,178

(22) Filed: Sep. 10, 2001

(51) Int. Cl.
*G06Q 40/00* (2006.01)
(52) U.S. Cl. .......................... 705/37; 705/38
(58) Field of Classification Search ............ 379/22, 379/2, 26.1; 382/139; 705/401, 36, 40, 39, 705/37, 34, 38, 35, 26
See application file for complete search history.

(56) References Cited

U.S. PATENT DOCUMENTS

| | | | | |
|---|---|---|---|---|
| 5,508,731 A | * | 4/1996 | Kohorn | 725/24 |
| 5,737,729 A | * | 4/1998 | Denman | 705/401 |
| 6,026,388 A | * | 2/2000 | Liddy et al. | 707/1 |
| 6,636,585 B2 | * | 10/2003 | Salzberg et al. | 379/22 |
| 6,760,470 B1 | * | 7/2004 | Bogosian et al. | 382/139 |
| 2002/0198829 A1 | * | 12/2002 | Ludwig et al. | 705/40 |

OTHER PUBLICATIONS

Synaro WebStore 3.0 Enhances Online Shopping Experience Business Editors/Technology Writers. Business Wire. New York: Jun. 27, 2001. p. 1.

* cited by examiner

*Primary Examiner*—Frantzy Poinvil
*Assistant Examiner*—Clement Graham
(74) *Attorney, Agent, or Firm*—Paul W. Martin; Priest & Goldstein, PLLC

(57) ABSTRACT

A system and method of tracking bill payment methods which stores details about payment to develop promotions. The system includes a touch screen, keyboard, or other device for recording customer identification information. A display displays payment method options based upon the customer identification information. A touch screen or keyboard for records bill payer selection of one of the payment options. A cash acceptor, check reader, or card reader receives payment in accordance with the one payment option. Finally, a processor determines predetermined details about the payment and stores the details.

15 Claims, 2 Drawing Sheets

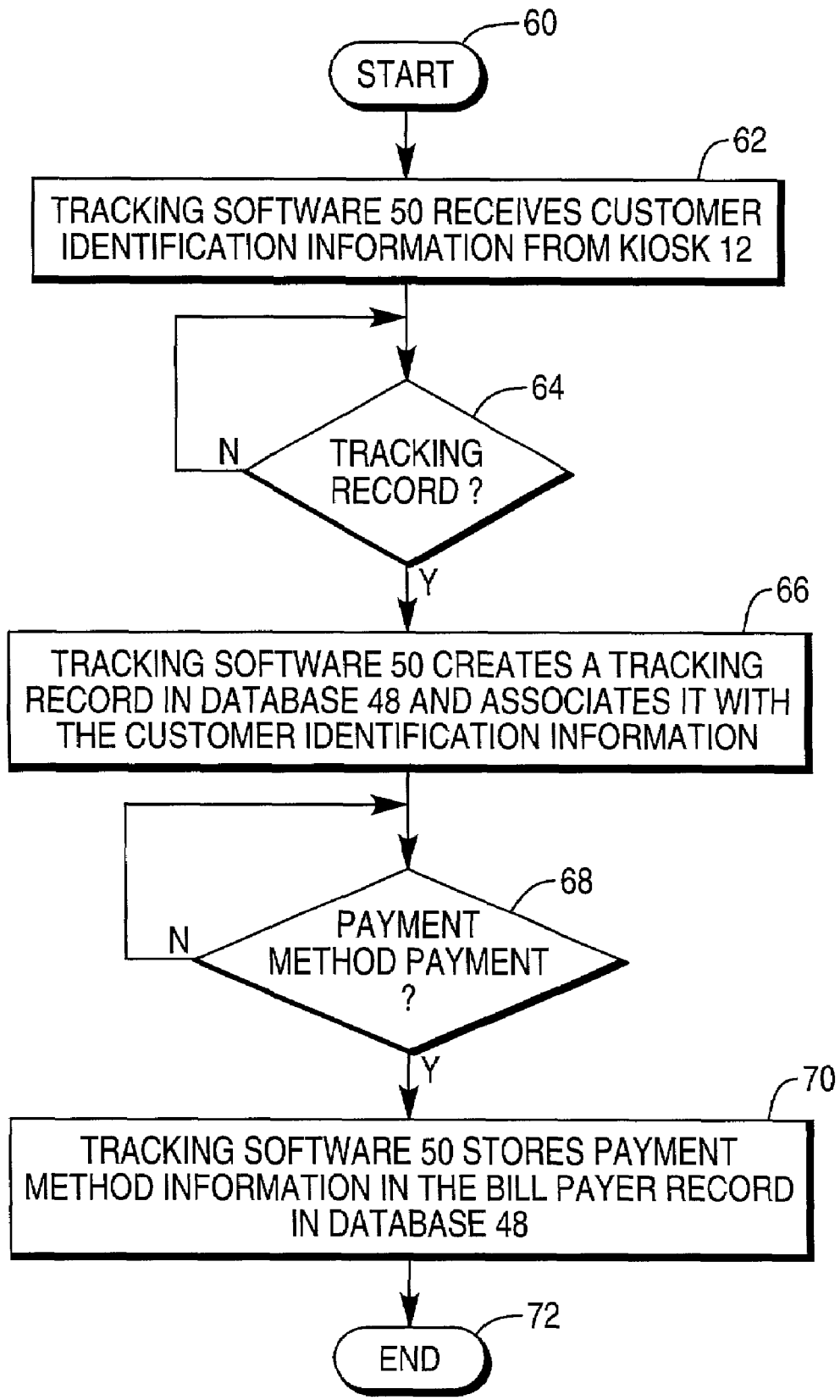

SYSTEM AND METHOD OF TRACKING BILL PAYMENT METHODS

BACKGROUND OF THE INVENTION

The present invention relates to self-service kiosks and more specifically to a system and method of tracking bill payment methods.

Kiosks provide a publicly accessible computing platform for displaying web pages and other web-delivered content from web sites. Kiosks may be located within a retailer's transaction establishment or elsewhere, such as in shopping malls. Kiosks may be easily networked to web sites using the TCP/IP protocol. Web pages from web sites may be displayed using known and available web software, such as Microsoft® Internet Explorer software.

Customers seek an effective way to pay bills. Bill providers wish to know how customers prefer to pay their bills, to support marketing to customers. Therefore, it would be desirable to provide a system and method of tracking bill payment methods.

SUMMARY OF THE INVENTION

In accordance with the teachings of the present invention, a system and method of tracking bill payment methods is provided.

The system includes a touch screen, keyboard, or other device for recording customer identification information. A display displays payment method options based upon the customer identification information. A touch screen or keyboard for records bill payer selection of one of the payment options. A cash acceptor, check reader, or card reader receives payment in accordance with the one payment option. Finally, a processor determines predetermined details about the payment and stores the details.

A method of tracking bill payment methods includes the steps of, recording customer identification information, displaying payment method options based upon the customer identification information, recording bill payer selection of one of the payment options, receiving payment in accordance with the one payment option, determining predetermined details about the payment, and storing the details.

The method may additionally include the step of analyzing the details to develop promotions from the details.

It is accordingly an object of the present invention to provide a system and method of tracking bill payment methods.

It is another object of the present invention to provide a system which can track cash payments, credit card payments, debit card payments, smart card payments, and check payments.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating the payment tracking method.

DETAILED DESCRIPTION OF THE PREFERRED EMBODIMENT

Figure 1:
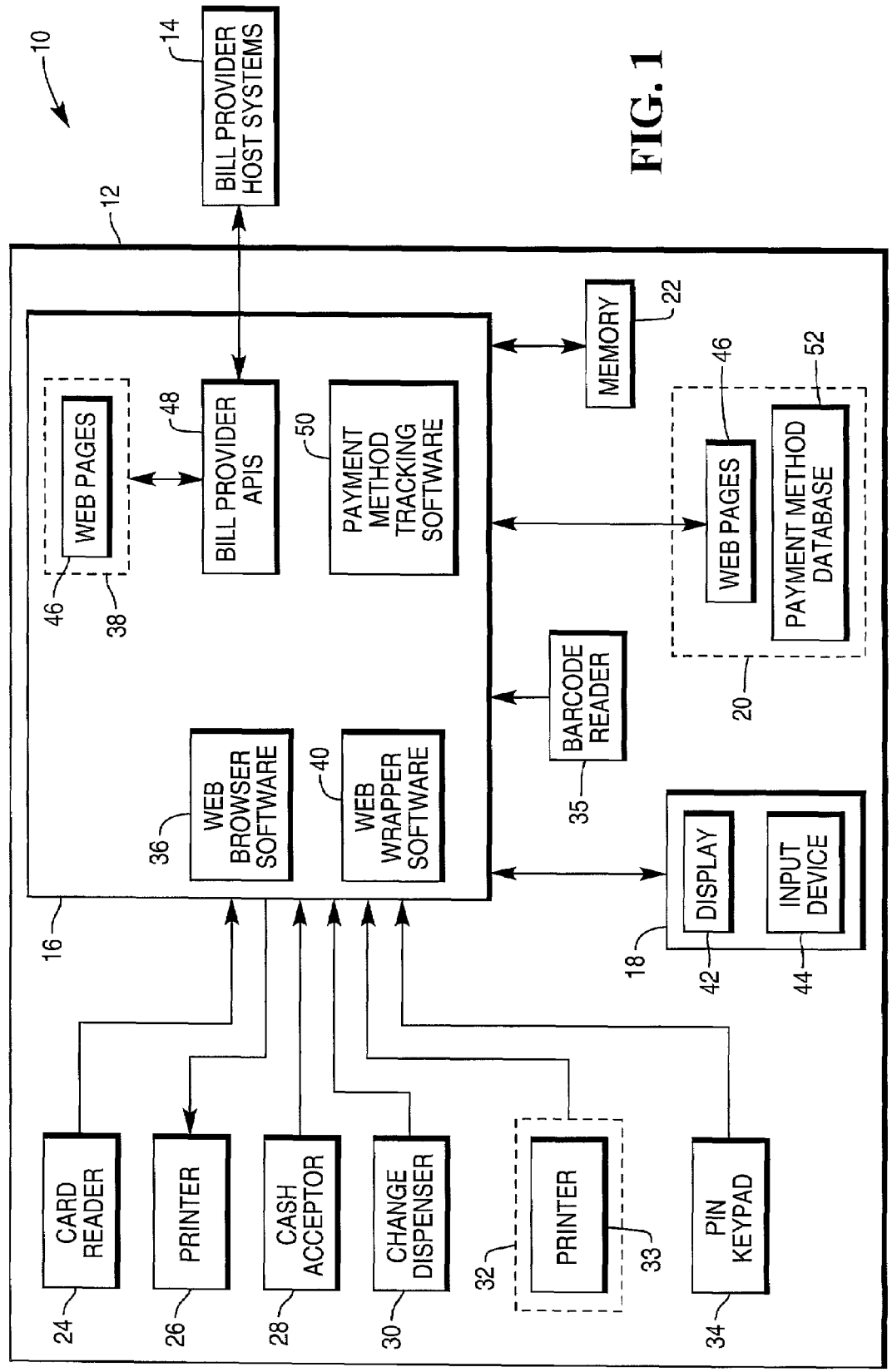
FIG. 1 is a block diagram of a bill paying system.

Turning now to FIG. 1, system 10 includes kiosk 12 and bill provider host systems 14. Kiosk 12 is preferably located in a bill provider's establishment or a public place. Kiosk 12 may include an NCR 7401 computer.

Kiosk 12 primarily includes processor 16, touch screen 18, memory 22, and storage medium 20. Kiosk 12 additionally includes a number of peripherals, including card reader 24, printer 26, cash acceptor 28, cash dispenser 30, check reader 32, and personal identification number (PIN) keypad 34.

Processor 16 executes bill payment application 38, which records bill payer information, retrieves bill information from bill provider host systems 14, displays instructions for completing payment of bills to bill providers, records bill payment via card reader 24, cash acceptor 28, or check reader 32, and dispenses change through cash dispenser 30.

In order to take cash or check payments, bill payment application 38 must also provide balancing functions, just like a point-of-sale terminal. This helps the kiosk owner create its deposit slip and balance the kiosk.

Bill payment application 38 communicates with bill provider host systems 14 over a network connection, such as one which uses the TCP/IP protocol. Kiosk 12 may be connected to the World Wide Web (web) and may obtain web content from web servers. Bill provider host systems 14 may be external web servers.

Bill payment application 38 interacts with each bill provider host system 14 through system-specific application programming interfaces (APIs) 48. APIs 48 include a different API for each bill provider host system.

Advantageously, use of multiple APIs allows a bill payer to use a single kiosk to pay bills from a plurality of bill providers through corresponding APIs. APIs 48 may be developed and provided by the bill providers or developed otherwise with system information provided by the bill providers.

Bill payment application 38 determines what messages need to be constructed and where they need to be sent. Following receipt of payment, bill payment application 38 sends a message to bill provider host system 14 containing the amount of the payment. Bill provider host system 14 credits the payment against the bill.

Processor 16 also executes payment method tracking software 50 for tracking bill payment methods. Payment method tracking software 50 tracks whether a customer pays by cash, check, or credit card. If the customer pays with cash, payment method tracking software 50 tracks bill denominations used by the customer, whether partial payments are made by the customer, and when payments are made by the customer. Within these categories, there are subcategories like, who uses all bills smaller than a five dollar bill, who always has one hundred dollar bills on them, who pays close to the bill due date, on the middle of the month, or on payday.

Payment method tracking software 50 stores data in payment method database 52. Using the data, payment method tracking software 50 determines whether there is any upsell potential for this customer. Payment method tracking software 50 can also determine whether changing the bill date would alter payment methods.

Payment method tracking software 50 may also pass the data in database 52 to bill provider host systems 14 so that systems 14 may analyze the data for marketing opportunities. Regardless of where the analysis is performed, kiosk 12 may alter billing schedules and display promotions based upon insights gleaned from the data.

Processor 16 may also execute web browser software 36 and web wrapper software 40.

Web browser software 36 allows an operator to display information in a format established by the World Wide Web (WWW or "web"). Bill payment application 38 may be written as a web application which displays bill and payment information in the form of web pages 46, although bill payment application may also be a non-web application and operate without web browser software 36 and web wrapper software 40. Web pages 46 may be written using hypertext markup language (HTML) or other suitable web page language.

Web browser software 36 may include commercially available web browser software, such as Microsoft® Internet Explorer web browser software. Microsoft® Internet Explorer web browser software is configured into a kiosk operation using a "-k" command line option. This option hides toolbars and menu bars to prevent operator access to those functions.

Web browser software 36 may also display a start or "home" page within web pages 46 which operates as a default page from which kiosk operation begins and to which operation returns when an operator is finished using kiosk 12. Web browser software 36 may also facilitate purchase of goods from retailers and may also serve to display advertisement when not in use.

Web wrapper software 40 provides security functions. During operation, web wrapper software 40 prevents an operator from accessing kiosk files, or other applications, or the operating system software, or basic input-output system (BIOS) firmware, and prevents the operator from causing kiosk 12 to reboot.

Touch screen 18 includes display 42 and input device 44. Display 42 and input device 44 may also be separate units. Input device 44 may record bill provider selection information from a bill payer.

Storage medium 20 stores web pages 44 for use by bill payment application 34 and other applications. Some of web pages 44 may be obtained from web servers. Storage medium 20 also stores payment method database 52.

Memory 22 is used by processor 16 to store executed program information.

Card reader 24 reads loyalty, credit, debit, SMART, and/or other types of cards carried by a bill payer. Card reader 24 may record payment information from a bill payer.

Printer 26 prints receipt information.

Cash acceptor 28 accepts cash in multiple denominations.

Cash dispenser 30 dispenses change.

Check reader 32 reads checks and includes a magnetic ink character (MICR) reader. Check reader 32 also includes printer 33 for printing information on checks.

PIN keypad 34 records PIN numbers for debit card transactions.

Kiosk 12 may additionally include barcode reader 35, which may be used to scan barcode labels on bills. The barcode labels contain bill payer identification and account information.

Bill provider host system 14 receives payment information from kiosk 12, credits payments against the bills, and reports successful receipt of payment information back to bill payment application 38.

Turning now to FIG. 2, operation of tracking software 50 is illustrated in detail beginning with START 60.

In step 62, tracking software 50 receives customer identification information from kiosk 12. Kiosk 12 may obtain customer identification information through touch screen 18 and card reader 24. For example, customer identification information may be obtained from bill provider host system 14 in response to a card number or directly from an identification card. Other identification methods are also envisioned, such as biometric identification.

In step 64, tracking software 50 determines whether a tracking record in database 52 exists. If so, operation proceeds to step 68. Otherwise, operation proceeds to step 66.

In step 66, tracking software 50 creates a tracking record in database 52 and associates it with the customer identification information.

In step 68, tracking software 50 waits for payment method information. For example, tracking software 50 logs whether a customer pays by cash, check, or credit card. If the customer pays with cash, tracking software 50 tracks bill denominations and other detailed information.

During this time, host system 14 sends customer account information to bill payment application 34. Bill payment application 34 displays payment method options, including cash, credit card, debit card, smart card, or check. Bill payment application 34 records payment, updates the customer's account information at bill provider host system 14, and prints a receipt.

In step 70, tracking software 50 stores payment method information in the bill payer record in database 52.

Operation ends at step 72.

Tracking software 50 provides data analysis tools for kiosk owners to promote their products or services. Using the data, tracking software 50 determines whether there is any upsell potential for this customer.

Kiosk 12 may transfer database 52 to corresponding bill provider host networks 14 for additional analysis. Each bill provider host network 14 may use the information in database 52 to promote its products or services, or make bill paying easier.

Although the present invention has been described with particular reference to certain preferred embodiments thereof, variations and modifications of the present invention can be effected within the spirit and scope of the following claims.

We claim:

1. A method of tracking methods by which customers elect to make bill payments comprising the steps of:

recording customer identification information at a publicly accessible interface;

displaying payment method options based upon the customer identification information;

recording bill payer selection of one of the payment options;

receiving payment in accordance with the one payment option;

identifying predetermined details about the payment, including details identifying the bill payer's choice of the mechanism of tendering payment;

storing the information identifying the bill payer's choice of the mechanism for tendering payment in memory;

outputting the predetermined details; and automatically analyzing the predetermined details including the circumstances surrounding the bill payer's tender of payment including the bill payer's choice of the mechanism for tendering payment.

2. The method as recited in claim 1, further comprising the step of:

analyzing the predetermined details about the payment to develop promotions.

3. The method as recited in claim 1, wherein the step of receiving payment comprises receiving payment in cash utilizing a cash acceptor to accept cash in multiple denominations.

4. The method as recited in claim 1, wherein the step of receiving payment comprises receiving payment via a card utilizing a card reader.

5. The method as recited in claim 1, wherein the step of receiving payment comprises receiving payment via a check utilizing a check reader.

6. A method of tracking methods by which customers elect to make bill payments at a bill payment kiosk comprising the steps of:
   recording customer identification information by the kiosk;
   displaying payment method options based upon the customer identification information by the kiosk;
   recording bill payer selection of one of the payment options by the kiosk;
   receiving payment in accordance with the one payment option by the kiosk;
   identifying predetermined details about the payment, including identification of the bill payer's choice of the mechanism to be used for tendering payment, by the kiosk;
   storing the information identifying the bill payer's choice of the mechanism for tendering payment;
   performing automated analysis of the predetermined details about the payment, the analysis of the predetermined details including automated analysis of the circumstances surrounding the bill payer's tender of payment including the bill payer's choice of the mechanism for tendering payment, so as to provide information related to bill payer habits and preferences, by the kiosk;
   using information relating to the habits and preferences of the bill payer to identify acceptable changes in billing that can be made that would conform more closely to the habits and preferences of the bill payer; and
   modifying billing procedures to implement such acceptable changes.

7. A method of tracking methods by which customers elect to make bill payments at a bill payment kiosk comprising the steps of:
   recording customer identification information by the kiosk;
   displaying payment method options, including cash, based upon the customer identification information by the kiosk;
   recording bill payer selection of one of the payment options by the kiosk;
   receiving payment in accordance with the one payment option by the kiosk;
   identifying predetermined details about the payment, including identifying the bill payer's choice of the mechanism to be used for tendering payment, by the kiosk, including the substep of the determining denominations of bills provided as payment;
   storing the information identifying the bill payer's choice of the mechanism for tendering payment beyond completion of the transaction;
   performing automated analysis of the predetermined details about the payment, the analysis of the predetermined details including automated analysis of the circumstances surrounding the bill payer's tender of payment including the bill payer's choice of the mechanism for tendering payment, so as to provide information relating to bill payer habits and preference, by the kiosk; and
   using information relating to the habits and preferences of the bill payer to identify acceptable changes in billing that can be made that would conform more closely to the habits and preferences of the bill payer; and
   modifying billing procedures to implement such acceptable changes.

8. A system for paying bills comprising:
   means for recording customer identification information;
   a display for displaying payment method options based upon the customer identification information;
   means for recording bill payer selection of one of the payment options in order to retain information identifying the bill payer's choice of the mechanism to be used for tendering payment;
   means for receiving payment in accordance with the one payment option; and
   a processor for identifying predetermined details about the payment, including details identifying the bill payer's choice of the mechanism for tendering payment, and for storing the details, including storing the information identifying the bill payer's choice beyond completion of the transaction, the processor being further operative to perform automated analysis of the predetermined details about the payment, the analysis of the predetermined details including automated analysis of the circumstances surrounding the bill payer's tender of payment including the bill payer's choice of the mechanism for tendering payment, so as to provide information relating to the bill payer's habits and preferences, the processor being further operative to use information relating to the habits and preferences of the bill payer to identify acceptable changes in billing that would conform more closely to the habits and preferences of the bill payer and modify billing procedures in order to implement such acceptable changes.

9. A bill payment kiosk comprising:
   means for recording customer identification information;
   a touch screen for displaying payment method options based upon the customer identification information and for recording bill payer selection of one of the payment options in order to retain information identifying the mechanism chosen by the bill payer for tendering payment;
   means for receiving payment in accordance with the one payment option; and
   a processor for identifying predetermined details about the payment, including details identifying the bill payer's choice of the mechanism to be used for tendering payment, and for storing the details, including storing the identification of the bill payer's choice beyond completion of the transaction, the processor being further operative to perform automated analysis of the predetermined details about the payment, the analysis of the predetermined details including automated analysis of the circumstances surrounding the bill payer's tender of payment including the bill payer's choice of the mechanism for tendering payment.

10. The kiosk as recited in claim 9, wherein the payment receiving means comprises a check reader.

11. The kiosk as recited in claim 9, wherein the payment receiving means comprises a card reader.

12. The kiosk as recited in claim 11, wherein the card reader comprises a debit card reader and wherein the kiosk further comprises a PIN keypad for recording a bill payer PIN during payment by a debit card.

13. The kiosk as recited in claim 9, wherein the payment receiving means comprises a cash acceptor.

14. The method of claim 1 wherein the method further comprises:
   using information relating to the habits and preferences of the bill payer to identify acceptable changes in billing that would conform more closely to the habits and preferences of the bill payer; and modifying billing procedures as needed to implement such acceptable changes.

15. The kiosk of claim 9 wherein the processor is further operative to analyze information relating to the habits and preferences of the bill payer to identify acceptable changes in billing that would conform more closely to the habits and preferences of the bill payer and to modify billing procedures to implement those acceptable changes.

* * * * *